Patented Aug. 22, 1944

2,356,587

UNITED STATES PATENT OFFICE 2,356,587

QUATERNARY AMMONIUM COMPOUNDS

Winfrid Hentrich, Dusseldorf-Reisholz, Wilhelm Kaiser, Dessau in Anhalt, and Werner Reuss, deceased, late of Dusseldorf-Benrath, Germany, by Carl-Heinz Winkler, administrator, Dusseldorf, Germany; vested in the Alien Property Custodian No Drawing. Application January 16, 1942, Serial No. 427,064. In Germany April 13, 1937

4 Claims. (Cl. 260—482)

The producing of amino-carboxylic acid amides or -esters including those which in the amido- or in the ester group contain at least one lipophile radical, or residue, is not new. It can be performed in letting react ammonia or amines upon halogenated carboxylic acid amides or -esters, but the converting of amino-carboxylic acid halogenides with alcohols or amines respectively is likewise practicable.

Now it has been found that valuable nitrogenous compounds are obtainable in converting such amino-carboxylic acid amides or -esters containing in the amino-nitrogen or in the ester group at least one lipophile radical, into quaternary ammonium compounds.

The amino-carboxylic acid amides or -esters which may be applied as initial materials for the present method, are of the general formula $R.R_1.N.R_2.CO.X.R_3$. In this formula R and $R_1$ mean hydrogen or any hydrocarbon radicals which also conjointly may form with the nitrogen-atom a heterocyclic ring; $R_2$ means a bivalent hydrocarbon radical; X represents $NR_4$ ($R_4$=hydrogen or any hydrocarbon radical) or O, whilst $R_3$ is to be a hydrocarbon radical with no less than 6 carbon atoms.

R and $R_1$ may, e. g., be formed of methyl-, ethyl-, propyl-, allyl- groups and the like, or they may also belong to a piperidine- or pyrrolidine ring. Further they may be formed of a benzyl-, furfuryl-radical and the like. The several compounds are similar, and to a substantial extent equivalents, in that they all have the important trivalent N atom. $R_2$ may be represented by, e. g., an ethylene-, phenyl ethylene-, propylene- or butylene radical and the like. $R_3$ may be formed of a higher molecular hydrocarbon radical containing no less than 6 C atoms of the aliphatic, cyclo-aliphatic, aromatic and fatty aromatic series such as a hexyl-, octyl-, decyl-, dodecyl-, cetyl-, octadecyl-, octadecenyl-, hydroxy-octadecenyl radical and the like. Moreover $R_3$ may be represented by a cyclohexyl radical, an alkylated cyclohexyl radical such as the p-dodecyl-o-methyl-cyclohexyl radical, a naphthenyl radical, an abietyl radical, a phenyl radical, an alkylated phenyl radical, a benzyl radical and the like. Those radicals may also contain hetero-atoms and hetero-atom groups such as oxygen, sulfur, nitrogen and the like. $R_4$ may be, e. g., a radical of methyl, ethyl, propyl, allyl, butyl, benzyl, furfuryl, phenyl and the like.

Among the amino-carboxylic acid amides or -esters applicable as initial materials for the present invention there are to be considered, e. g., dimethyl-amino-acetic acid-octyl-amide, piperidino-acetic acid-octyl-amide, dimethyl-amino-butyric acid-dodecyl-amide, dimethyl-amino-acetic acid-undecylene-amide, dimethyl-amino-acetic acid-dodecyl-amide, di-ethyl-amino-acetic acid-cetyl-amide, β-dimethyl-amino-α-diethyl-propionic acid cetyl-ester, piperidino-acetic acid-dodecyl-benzyl-amide, dimethyl-amino-acetic acid-(p-dodecoxy)-phenyl-amide, and further the amino-acetic acid-dodecyl-amide, methyl-amino-acetic acid-cetyl ester, amino-propionic acid-dodecyl-benzyl amide and the like.

The converting of those compounds into quaternary ammonium compounds is accomplished by direct reaction of mineral acid esters of aliphatic, fatty aromatic, cyclo-aliphatic or heterocyclic alcohols such as alkyl-halogenides, e. g., methyl-chloride, methyl-iodide, allyl-bromide, octyl-bromide, hexadecyl-bromide, further the dimethyl sulfate, diethyl-sulfate, octyl-mono-sulfuric acid ester, benzyl chloride, furfuryl chloride, tetrahydro-furfuryl chloride and the like.

The conversion by reaction between the amino-carboxylic acid amides or -esters, on the one hand, and the mineral acid esters, on the other hand, is performed while warming up and eventually in the presence of solvents or diluents.

Products, which may be obtained according to the prescribed process are, e. g., dimethylamino-acetic acid-octylester-chloromethylate, dimethyl-amino-propionic acid-dodecylester-chloromethylate, dimethylamino-butyric acid-dodecylester-chloromethylate, dimethylamino-butyric acid-hexadecylester-chloromethylate, dimethylamino-phenyl-acetic acid-dodecylester-chloromethylate, diethylamino-acetic acid-dodecylester-chlorobenzylate, dibutylamino-acetic acid-dodecylester-chlorobenzylate, difurfurylamino-acetic acid-dodecylester-chlorobenzylate, diallylamino-acetic acid-dodecylester-chlorobenzylate, piperidino-acetic acid-dodecylester-chlorobenzylate, pyrrolidino-acetic acid-dodecylester-chlorobenzylate, benzyl methyl-amino-acetic acid-dodecylester-chlorobenzylate, benzyl cyclohexylamino-acetic acid-dodecylester-chlorobenzylate, dimethylamino-acetic acid-decylester-chloromethylate, dimethylamino-acetic acid-octadecylester-chloromethylate, dimethylamino-acetic acid-octadecenylester-chloromethylate, dimethylamino-acetic acid-p-dodecyl-o-methyl-cyclohexyl-ester-chloromethylate, dimethylamino-acetic acid-naphthenyl-ester-chloromethylate, dimethylamino-acetic acid-dodecylester-iodomethylate, dimethylamino-acetic acid-dodecylester-bromoctylate, dimethylamino-acetic acid dodecylesterchlorohexadecylate, dimethylamino-acetic acid-dodecylester-chlorofurfurylate, dimethylamino-acetic acid-dodecylester-chlorotetrahydrofurfurylate, dimethylamino-acetic acid-dodecylester-methosulfate.

Example 1

To 310 parts by weight of melted dodecyl-amide of the piperidino-acetic acid, 127 parts by weight of benzyl chloride are added while stirring and at a temperature of 50° C. After warming up from 50 to 60° C. until the reaction is at its end, one allows cooling, whereby the melt solidifies to a crystalline mass. The thus obtained piperidino-acetic acid-dodecyl-amide-chlorobenzylate dissolves clear in water and the aqueous solution is much lathering. By re-crystallizing from xylol the product can be obtained quite colourless (melting point 114° C.). A similar compound is obtained in warming 7 parts by weight of piperidino-acetic acid-dodecyl-benzyl amide up to 50–60° C. for about 2 hours together with 2.2 parts by weight of dimethyl-sulfate.

Example 2

19 parts by weight of piperidino-acetic acid-dodecyl-ester are warmed up to 80–90° C. for 8 hours together with 13 parts by weight of benzyl-chloride. Then the mixture is dissolved in water and warmed, whereby the excess benzyl-chloride, which is floating in the form of oil on the surface of the solution, is to be separated off. After evaporating the solution liberated from the benzyl-chloride, we obtain the piperidino-acetic acid-dodecyl-ester-chlorobenzylate in the form of a powder. One may also substitute a mixture of fatty alcohol esters for the dodecyl-ester.

Example 3

270 parts by weight of dimethyl-amino-acetic acid-dodecyl-amide are warmed up to 50–60° C. for several hours together with 127 parts of benzyl-chloride. The thus obtained crystalline mass may eventually be ground with a solvent (decahydronaphthalin) for purification. By sucking off the solvent we obtain the dimethyl-amino-acetic acid-dodecyl-amide-chlorobenzylate being a well crystallized substance (melting point 147 to 148° C.) soluble clear in water.

In a similar manner we obtain the dimethyl-amino-acetic acid (furfuryl-dodecyl-amide)-chloromethylate, piperidino-acetic acid (4-sec.-octyl - 2 - methyl - cyclohexyl - methyl - amide) - chlorobenzylate, (benzyl-methyl-amino) - acetic acid - (methyl-dodecyl-amide)-chloromethylate, dimethyl - amino - acetic acid (benzyl - dodecyl-amide)-chloromethylate and the like.

Example 4

270 parts by weight of dimethylamino-acetic acid-dodecylester are warmed with 127 parts by weight of benzyl-chloride for 8 hours at 90° C. The reaction mixture is freed from the excess of benzylchloride. We obtain the dimethyl-amino-acetic acid-dodecylester-chlorobenzylate, which is clear soluble in water.

Example 5

To 135 parts by weight of diethylamino-acetic acid-decylester 114 parts by weight of benzyl-chloride are added and warmed for 6 hours at 70–80° C. The thus obtained crystalline mass is purified by means of a solvent. The diethyl-amino-acetic acid-decylester-chlorobenzylate is obtained, which may be recrystallized from xylol.

Those quaternary ammonium compounds distinguish themselves, without counting their water-solubility and indifference to hardness-provokers of the water and to hydrolysing influences, not only by an excellent soap-like action, but also by a most remarkable disinfecting action upon, e. g., the Staphylococcus and the typhus Bacillus.

Those compounds offer moreover the advantage of being obtainable in a generally very good crystalline form allowing an easy dosing and mixing with substratums. Besides this we can without difficulty obtain crystallizable products of such a purity as required, e. g., for pharmaceutical purposes.

The aforesaid compounds may be applied either alone or mixed with other disinfecting media and eventually with an addition of diluents or stretching agents for the disinfection of commodities, medical instruments, textiles, linen, walls, tile floors, implements, apparatus used in the alimentary and appetizing products industry, as well as for the disinfecting of animals and parts of the human body. Moreover they are apt for the preserving of perishable animal and vegetable goods such as pastes and sizes, furs, hides, skins and the like.

The quaternary amino-carboxylic acid-amides of the present invention are, e. g., of the general formula $Am.R'.CO.N.R''R'''$. In this formula $R'.CO$ means the radical of an aliphatic acid such as acetic acid, propionic acid and butyric acid, $R''$=hydrogen or any organic radical. $R'''$ means a lipophile radical such as octyl-, nonyl-, decyl-, dodecyl-, tridecyl-, tetradecyl-, hexadecyl radical or the like. "Am" represents any quaternary ammonium group containing anion. The ammonium group may contain equal or mixed aliphatic, aromatic, aliphatic-aromatic or heterocyclic radicals. Of a particularly good disinfecting power are those compounds, which in the molecule, e. g., in the quaternary ammonium group or on the amino-nitrogen contain a non-saturated organic radical such as the benzyl radical, the allyl-radical and the like.

The compounds of the present invention may therefore be applied also with alkaline or acid materials. Moreover they are of a good wetting-power by which the penetration into textiles and the spreading-out on soiled and stained surfaces is considerably enhanced. The efficiency and the mode of application of the compounds in question as disinfecting and preserving agents is shown by the following examples:

(a) A 0.01%-solution of (benzyl-methyl-amino)-acetic acid-dodecylamide-chloromethylate of the formula $(CH_3)_2.(C_7H_7)NCl.CH_2.CO.NH.C_{12}H_{25}$ kills completely, at 20° C. a deposit of Mycoderma within 15 minutes.

A 0.002%-solution of the same compound destroys completely at 20° C., a deposit of bacteria coli within 45 minutes.

A 0.005%-solution of the same compound destroys completely, at 20° C. a deposit of Staphyloccus aureus within 5 minutes.

Of a similar efficiency are also the compounds where the dodecyl-radical is replaced by an octyl-, decyl- or tetradecyl radical, as well as the mixtures of those bodies.

(b) A 0.01%-solution of dimethyl-amino-acetic acid-dodecyl-amide-chloromethylate of the formula $(CH_3)_3.NCl.CH_2CO.NH.C_{12}H_{25}$ kills, at 20° C., a deposit of bacteria coli completely within 15 minutes.

A 0.014%-solution of the same compound destroys completely, at 20° C., a deposit of pyocyaneus within 5 minutes.

(c) A 0.005%-solution of dimethyl-aminoacetic acid (benzyl-dodecyl-amide)-chloromethylate of the formula (CH₃)₃.NCl.CH₂.CO.N(C₇H₇).(C₁₂H₂₅)

kills completely a deposit of bacteria coli within 15 minutes.

The same efficiency shows a 0.005%-solution of piperidino-acetic acid-dodecylamide-chloromethylate of the formula (CH₃).(C₅H₁₀).NCl.CH₂CO.NH.C₁₂H₂₅

(d) The 1%-solution of a mixture of 70 parts by weight of crystallized sodium-meta-silicate, 29 parts of crystallized tri-basic sodium-phosphate and 1 part of the dimethyl-amino-acetic acid-dodecyl-amide-chloromethylate (mentioned in Example 2), kills completely, at 50° C., a deposit of Mycoderma within 5 minutes. This solution may be heated for a rather long time and kept for several days without reducing its disinfecting power.

(e) A 0.005%-solution of (benzyl-methyl-amino)-acetic acid-(methyl-dodecyl-amide)-chloromethylate of the formula (CH₃)₂.C₇H₇.NCl.CH₂CO.N(CH₃).(C₁₂H₂₅)

kills completely, at 20° C., a deposit of bacteria coli within 30 minutes.

(f) A 0.01%-solution of dimethyl-aminophenyl-acetic acid-dodecyl-amide-chloromethylate of the formula (CH₃)₃.NCl.CH.(C₆H₅)CO.NH.C₁₂H₂₅ destroys entirely, at 20° C., a deposit of bacteria coli within 15 minutes.

(g) A 0.002%-solution of benzyl-cycloexyl-amino-acetic acid-dodecylamide-chloromethylate of the formula (CH₃).(C₇H₇).(C₆H₁₁).NCl.CH₂.CO.NH.C₁₂H₂₅ kills completely, at 20° C., a deposit of bacteria coli within 45 minutes.

(h) 40 parts by weight of caustic soda, 30 of sodium-meta-silicate of the formula Na₂SiO₃.5H₂O 19 parts by weight of calcined tribasic-sodium-phosphate, 10 of calcined sodium and 1 part of piperidino-acetic acid-dodecylamide-chlorobenzylate of the formula (C₅H₁₀).(C₇H₇).NCl.CH₂.CO.NH.C₁₂H₂₅ are well mixed together. An aqueous solution of this mixture at the ratio of 0.25% kills entirely, at 50° C., a deposit of bacteria coli within 6 minutes.

(i) A 0.01% solution of dimethylamino-acetic acid-dodecylester-chloromethylate of the formula (CH₃)₃.N.Cl.CH₂.CO.O.C₁₂H₂₅ kills, at 20° C., a deposit of bacteria coli completely within 20 minutes.

(k) A 0.015% solution of piperidino-acetic acid-dodecylester-chlorobenzylate of the formula (C₅H₁₀).(C₇H₇).N.Cl.CH₂.CO.O.C₁₂H₂₅ destroys entirely, at 20° C., a deposit of bacteria coli within 12 minutes.

(l) A 0.005% solution of diethylamino-acetic acid-decylester-chlorobenzylate of the formula (C₂H₅)₂.(C₇H₇).N.Cl.CH₂.CO.C₁₂H₂₅ kills, at 20° C., a deposit of bacteria coli within 15 minutes.

The aqueous solutions of this mixture may be applied as excellent detergents of a simultaneous disinfecting action. My preferred quaternary ammonium compounds have this structural formula $$C_6H_5-CH_2-\overset{(R)_2}{\underset{R_3}{N}}-CH_2-COOR_3$$

in which R is a lower alkyl hydrocarbon radical, R₂ is a halogen and R₃ is a straight chain hydrocarbon radical of 6 to 18 carbon atoms, specifically R₃ may be a decyl, an octodecyl or a duodecyl hydrocarbon radical.

The present application is a continuation-in-part of application Serial No. 200,839½, filed April 8, 1938, which has matured into Patent 2,295,655, September 15, 1942.

We claim:

1. Quaternary ammonium compounds of the formula $$C_6H_5-CH_2-\overset{(R)_2}{\underset{R_3}{N}}-CH_2-COOR_3$$

in which R is a lower alkyl, R₂ is a halogen and R₃ is a straight chain hydrocarbon radical of 6 to 18 carbon atoms.

2. Quaternary ammonium compounds of the formula $$C_6H_5-CH_2-\overset{(R)_2}{\underset{R_3}{N}}-CH_2-COOR_3$$

in which R is a lower alkyl, R₂ is a halogen and R₃ is a straight chain alkyl decyl hydrocarbon radical.

3. Quaternary ammonium compounds of the formula $$C_6H_5-CH_2-\overset{(R)_2}{\underset{R_3}{N}}-CH_2-COOR_3$$

in which R is a lower alkyl, R₂ is a halogen and R₃ is a straight chain duodecyl hydrocarbon radical.

4. Quaternary ammonium compounds of the formula $$C_6H_5-CH_2-\overset{(R)_2}{\underset{R_3}{N}}-CH_2-COOR_3$$

in which R is a lower alkyl, R₂ is a halogen and R₃ is a straight chain octodecyl hydrocarbon radical.

WINFRID HENTRICH.
WILHELM KAISER.
CARL-HEINZ WINKLER,
*Administrator of the Estate of Werner Reuss, Deceased.*